United States Patent [19]

Draper et al.

[11] 4,035,543

[45] July 12, 1977

[54] LAMINATE SUITABLE AS HYDROCARBON RESISTANT POND LINER

[75] Inventors: Homer L. Draper; Duane W. Gagle, both of Bartlesville, Okla.

[73] Assignee: Phillips Petroleum Company, Bartlesville, Okla.

[21] Appl. No.: 573,487

[22] Filed: May 1, 1975

[51] Int. Cl.$^2$ .................................. B32B 7/00
[52] U.S. Cl. ............................ 428/245; 61/1 R; 428/286; 428/300; 428/301; 428/515
[58] Field of Search ............ 61/1 R; 156/148, 306; 428/213, 218, 265, 286, 288, 290, 296, 297, 301, 303, 332, 333, 500, 515, 516, 910

[56] References Cited

U.S. PATENT DOCUMENTS

| | | | |
|---|---|---|---|
| 2,949,394 | 8/1960 | Rodman | 428/297 |
| 3,282,771 | 11/1966 | Goodman et al. | 428/296 |
| 3,474,625 | 10/1969 | Draper et al. | 61/1 R |
| 3,576,687 | 4/1971 | Parlin | 156/148 |
| 3,666,585 | 5/1972 | Barbehenn et al. | 428/515 |
| 3,676,242 | 7/1972 | Prentice | 156/62.4 |

OTHER PUBLICATIONS

"Textbook of Polymer Chemistry" Fred Billmeyer, 1957, Interscience Publishers Inc., p. 332.

*Primary Examiner*—James J. Bell

[57] ABSTRACT

A laminate is provided having sufficient strength and hydrocarbon resistance to be used as a pond liner. The laminate has at least one cohesive batt of polypropylene fiber having a weight of about 100 g/m$^2$ to about 250 g/m$^2$ heat bonded to at least one polyethylene film having a thickness of about 10 to about 50 mils and a density of about 0.905 to about 0.925 g/cc.

9 Claims, No Drawings

LAMINATE SUITABLE AS HYDROCARBON RESISTANT POND LINER

BACKGROUND OF THE INVENTION

This invention relates to laminates. In one of its aspects this invention relates to laminates having hydrocarbon resistance. In another of its aspects this invention relates to laminates having puncture resistance. In yet another of its aspects this invention relates to laminates suitable in the production of pond liners.

Generally, laminates which have been used as liners for ponds and ditches have comprised various forms of polyolefin sheeting alone or in combination with an anchoring or strength giving material. Often these lining materials are impregnated with asphalt either over the whole surface of the liner or, at least, at the joints between sheets making up the total liner. It has been found that when many of these materials are subjected to the exigencies of practical use, particularly where hydrocarbons may be accidentally or purposely introduced into contact with the liner, failure of the material occurs within a short time. We have discovered a laminated material that has sufficient strength to withstand the everyday uses of a pond liner and also has hydrocarbon resistance sufficient to prevent short-run failure in service in contact with liquid hydrocarbons.

It is an object of this invention to provide a laminate suitable as a pond liner for service in contact with liquid hydrocarbons.

Other aspects, objects and the various advantages of this invention will become apparent upon reading the specification and the appended claims.

STATEMENT OF THE INVENTION

A laminate suitable as a hydrocarbon resistant pond liner is provided comprising at least one cohesive batt of polypropylene fiber having a weight of about 100 g/m² to about 250 g/m² heat bonded to at least one polyethylene film having a thickness of about 10 to about 50 mils (0.254–1.28 mm) at a density of about 0.905 to about 0.925 g/cc.

The laminate comprises a non-woven polypropylene fabric, weight between about 3 and about 8 oz/yd² (100 g/m²–250 g/m²). To provide adequate strength to the laminate the non-woven fabric must be a cohesive batt of polypropylene fibers such as produced by weaving or by carding and then needle punching a batt of polypropylene fibers and heat fusing the batt on at least one side. This carding and needle punching is a conventional process as, for example, described in U.S. Pat. No. 3,535,178. Other suitable processes are described in copending application Ser. No. 498,777 filed Aug. 19, 1974. Woven fabric is preferably made from polypropylene yarn or from fibers made by splitting highly biaxially oriented polypropylene film.

The film suitable for our laminate is a low density polyethylene blown film made from a polyethylene having a density (g/cc) between about 0.905 to about 0.925 and from about 10 to about 50 mils thick (0.254–1.28 mm) preferably about 12 to about 14 mils (0.32–0.38 mm). Above 50 mils the film becomes too stiff and at less than 10 mils, the film does not have sufficient strength so that pin holes are produced in the laminate. Such a film is available under the trade name "Visqueen" (Visking Corp.). Other film types are not useful because of high temperature required for bonding which would ruin the fabric or because the films do not bond without adhesives.

The film used in forming the laminate of the invention must be low density polyethylene (density 0.905–0.925 g/cc), which has a lower melting point than the polypropylene in the fabric and thus can be heat fused to the fabric substrate. High density polyethylene or polypropylene films cannot be used to make the laminates of this invention as the fusing temperature would be too high and would destroy the fabric.

Three types of laminates can be made:

1. Fabric with film on unfused side of the fabric (unfused side for first film is preferred). Several layers of this laminate can be fused to provide a multi-stage laminate.
2. Fabric with film on both sides of the fabric — one fused side.
3. Two layers of fabric with film between them, fused side in.

Laminates are made by passing the superimposed fabric and film over a heating station and simultaneously applying pressure. The heat and pressure are applied to the film side of the superimposed sections. If the fabric is to be sandwiched between two sheets of film both films have to be heated. Laminates comprising two layers of fabric with film between can be made by heating the film on both sides and immediately pressing the fabric on both sides of the film. Preferably, heated rollers are used to laminate the components. The temperature at which lamination takes place is 250°–300° F (121°–148° C), preferably 270°–290° F (132°–143° C).

The following examples describe typical processes for preparing laminates of this invention suitable as pond liners and comparative tests with other materials of hydrocarbon resistance. These examples are meant to be exemplary and are not exclusive.

The non-woven fabric described in the examples below was made from polypropylene staple fibers, averaging 4 inches (10 cm) long. The fibers were garnetted or carded while superimposed on a carrier of polyester warp threads (30 cotton count), about 4 threads per inch (2.54 cm) width, needled on a conventional needle loom at about 300 punches/sq. in. (6.5 cm²), the needled batt was subjected at least on one side to a fusion step by passage through a pair of nip rolls, one of which was heated above the fusion temperature of the fibers (about 325° F, 162° C).

The film in all cases was a blown film of black low density polyethylene, 6 mil thick (0.15 mm), with a fusion temperature of about 110° C. In order to achieve the required thicknesses set out in the examples, multiple plies of this film were used ("Visqueen" polyethylene film, Visking Corp.).

EXAMPLE I

A section of a black polypropylene non-woven fabric as described above weighing about 5 oz/yd² (167 g/m²), about 12 × 18 inches (31 × 46 cm) [1] was laminated to low density polyethylene films 18, 24 and 30 mils thick (0.45, 0.61, and 0.756 mm) [2] × 2 inches (5.18 cm) wide, respectively, (these thicknesses of film were made by superimposing the proper multiples of 6 mil low density black film described above) by passing a heated steel platen at 290° F (143° C) over the superimposed pieces. The fabric had been heat fused on one side and the film was laminated to the unfused side.

(1) Petromat® Fabric (Phillips Petroleum Co.) (2) Visqueen® polyethylene film (Visking Corp.)

The low density film made a smooth continuous surface and the film could not be separated from the fabric by peeling or inserting a knife blade. The film appeared to have become an integral part of the fabric. All the pieces were sufficiently flexible to be useful as pond liners.

A similar test made with a 6 mil (0.152 mm) thick low density polyethylene film was discontinuous and showed pinholes.

EXAMPLE II

Samples were prepared as in Example I except that both sides of the fabric as described above were covered with a low density polyethylene film 12 mils (2 plies of 6 mil film) thick at 290° F (143° C).

Two 2-inch (3.08 cm) wide strips of the laminate were then joined lapping ½-inch (1.27 cm) and subjecting them to a heated platen at 250° F (121° C). A very strong joint was made. A joint of this type is useful to form a liquid tight seal when such a laminate is used in a pond.

Two 2-inch (3.08 cm) wide strips of the laminate were then butt joined by applying a 12 mil (.30 mm) strip to the abutting section and fusing it at 250° F (121° C) with a heated platen. A liquid tight joint was made by this method also.

EXAMPLE III

A multilayer sandwich was prepared by superimposing 2-inch strips (5.1 cm) of 12 mil (0.30 mm) film (2 plies of 6 mil film) and 5 oz/yd² (167 g/m²) non-woven fabric as used in Example I in alternate layers with film layers on both sides. Four layers of fabric and five layers of film were laminated at 290° F (143.3° C) using a heated platen.

EXAMPLE IV

In order to test hydrocarbon resistance of the low density polyethylene film/non-woven fabric laminate the following series of tests were made:

9 × 9 inch (about 23 × 23 cm) sections of 5 oz/yd² (167 g/m²) non-woven polypropylene fabric as in Example I were laminated to two plies of black low density polyethylene film, each ply 6 mils thick (0.15 mm). A platen press heated to 280°–290° F (138°–143° C) was used at 20 psig applied pressure (137.9 kPa). Various samples as shown in Table 1 were prepared.

Control samples were made by bonding the film to the fabric with SS-1H (ASTM D-751-73) asphalt emulsion or by spraying the non-woven fabric with asphalt emulsion at a rate of 0.25 to 0.30 gal/S.Y. (1.13–1.36 l/m²).

2 × 4 inch (3.04 × 6.08 cm) sections of the samples, as described below were placed in quart jars (900 ml) containing Stoddard Solvent meeting ASTM D-484 specifications. The samples were completely immersed in the solvent at room temperature for the 24-hour test period. Observations were made initially, after 15 minutes, 1 hour, 2 hours and 24 hours.

| Rating System | | |
|---|---|---|
| 0 | Very poor | Complete failure, no resistance |
| 1 | Poor | Partial failure, poor resistance |
| 2 | Fair | Moderate attack, fair resistance |
| 3 | Good | Slight attack, good resistance |
| 4 | Very good | No attack, excellent resistance |

The results are summarized in the table below:

TABLE I

| Sample No. | Description of Laminate | Initial | 15 min. | 1 hr. | 2 hrs. | 24 hrs. | Remarks |
|---|---|---|---|---|---|---|---|
| 1 | 12 mil (.31 mm) film on non-fused side of non-woven fabric | 4 | 4 | 4 | 4 | 4 | No failure |
| 2 | 12 mil film on both sides of fused fabric, heat laminated | 4 | 4 | 4 | 4 | 4 | No failure |
| 3 | 12 mil film in center of two plies of fused fabric, heat laminated | 4 | 4 | 4 | 4 | 4 | No failure |
| 4 | 12 mil film on non-fused side, bonded with SS-H asphalt emulsion--not heat bonded | 3.5 | 3 | 2.5 | 1 | 0 | Initial leaching-film separation at 1 hr. failure between 1 and 2 hrs. |
| 5 | 12 mil film on both sides of fused fabric, laminated with SS-1H asphalt emulsion | 3.5 | 3 | 2 | 0 | 0 | Initial leaching-film separation at 1 hr. Failure between 1 and 2 hrs. |
| 6 | 12 mil film in center of two plies of fabric, laminated with SS-1H asphalt emulsion | 3.5 | 3 | 2 | 0 | 0 | Initial leaching-film separation at 1 hr. Failure between 1 and 2 hrs. |
| 7 | Fabric sprayed with asphalt emulsion | 3.5 | 3.5 | 3 | 2 | 1 | Initial leaching-asphalt peeled in layers after 6 hrs. soaking |

All samples made of the non-woven fabric fused on one side only which were heat laminated to the low density polyethylene film passed the 24 hour soak test as shown above. They were further tested for 120 hours without failures. All asphalt laminates failed after 2 hours in the solvent. The data demonstrate the excellent resistance to hydrocarbon attack of the laminates made according to the invention.

EXAMPLE V

Another series of tests was conducted to test the resistance to puncture of the laminate compared to the film or fabric by itself. The tests were made in accordance with ASTM D-751-73 using 5 and 6 inch I.D. (12.7 and 15.3 cm) puncture area and a ⅜ inch diameter (0.95 cm) tip at a rod travel rate of 2 inches (5.08 cm)/minute. The pressure to rupture is reported in psi (kPa). Laminates were made as in Example 4. As indicated in Table 2 some samples additionally were subjected to a hot roll treatment after initial fusion.

The fabrics and films used in this series of tests were the same type of materials as described above.

The tests are summarized in Table 2.

polyethylene film. During the heat fusing step of the film to the fabric, the film becomes an integral part of the fabric so that the two materials cannot be separated without destroying the laminate.

We claim:

1. A pond liner comprising strips of laminate, said laminate comprising polyethylene film having a thickness of about 10 to about 50 mils and a density of about 0.905 to about 0.925 heat bonded to polypropylene fiber having a weight of about 100 g/m² to about 250 g/m² chosen from (1) woven fabric and (2) needle-punched non-woven batt with said non-woven batt heat fused on at least one side, wherein said strips of laminate are sealed with a liquid-tight seam.

2. A pond liner of claim 1 wherein said strips of laminate are overlapped.

3. A pond liner of claim 2 wherein in the laminate a film is heat bonded on the unfused side of said polypro- Table 2

| Materials Tested | Fusion Temp.(1) °F | Time Sec. | Rolled Temp. °F | Time Sec. | Sample Disc 0 inches | Pressure, psi (kPa) to Rupture | | | Avg. |
|---|---|---|---|---|---|---|---|---|---|
| | | | | | | Run No. 1 | Run No. 2 | Run No. 3 | |
| I Controls | | | | | | | | | |
| A Film Only | | | | | | | | | |
| 1   6 mil (0.15 mm) | — | — | — | — | 6* | 10(68.94) | 8(55.15) | 9(62.1) | 9(62.1) |
| 2   12 mil (0.31 mm) | — | — | — | — | 6 | 18(124.1) | 18(124.1) | 17(127.0) | 18(124.1) |
| 2-A 12 mil (0.31 mm) | 280–290 | 60 | — | — | 6 | 19(131.0) | 18(124.1) | 18(124.1) | 18(124.1) |
| B Non-Woven Fabric Only | | | | | | | | | |
| 3   1 ply | — | — | — | — | 6 | 77(530.8) | 64*** | 81(558.4) | 79(544.6) |
| 3-A 1 ply | 280–290 | 60 | 280–290 | 30 | 6 | 68(468.8) | 62*** | 72(496.4) | 70(482.6) |
| 3-B 1 ply | — | — | — | — | 5** | 74(510.2) | 86*** | 78(537.7) | 76(523.9) |
| 4   2 ply | — | — | — | — | 6 | 160(1103) | 172(1185.8) | 143*** | 166(1144.4) |
| 4-A 2 ply | 280–290 | 60 | 280–290 | 30 | 6 | 149(1027) | 134*** | 152(1047.9) | 151(1041) |
| II Laminates Type(2) | | | | | | | | | |
| 5   1 | 280–290 | 60 | 280–290 | 30 | 6 | 86(592.9) | 80(551.5) | 68*** | 83(572.2) |
| 6   2 | 280–290 | 60 | 280–290 | 30 | 6 | 100(689.4) | 86*** | 104(717.0) | 102(503.2) |
| 6-A 2 | 280–290 | 60 | 280–290 | 30 | 5 | 97(668.7) | 98(675.6) | 108(744.6) | 98(675.6) |
| 7   3 | 280–290 | 60 | 280–290 | 30 | 6 | — | 166(1144.4) | 140(965.2) | 153(1054.8) |
| 8   Asphalt sprayed) | — | — | — | — | 6 | 84(579.1) | 82(565.3) | 66*** | 83(572.2) |

Footnotes Table 2:
(1)138–143° C
*15.24 cm
**12.7 cm
***Tests not used in averages
(2)Types of laminates:
1 Fabric with film on unfused side of the fabric (unfused side for first film is preferred)
2 Fabric with film on both sides of the fabric, one fused side
3 Two layers of fabric with film between them, fused side in The tests show that the laminate was about as puncture resistant as could be expected with a single ply of film and fabric. The figures are nearly additive. Thus the heat and pressure lamination did not adversely affect the puncture resistance but each section contributed its proportionate strength to the laminate while the resistance to hydrocarbon attack was improved considerably.

In summary, a hydrocarbon attack resistant hydraulic barrier laminate is provided comprising:

a. a fabric; either woven or non-woven (preferably a non-woven, needled and heat fused on one side) polypropylene fabric having a weight of 3–8 oz/yd² (100–250 g/m²); more preferably non-woven polypropylene fabric fused on one side.

b. a hydrocarbon resistant non-porous film 10–50 mils thick (0.254–128 mm) heat sealed to at least one ply of the fabric without use of additional adhesive. The film is selected to melt at a temperature sufficiently below the melting point of the fabric material so that during the heat lamination the structure of the fabric is not altered. The preferred film material is a low density pylene fiber.

4. A pond liner of claim 2 wherein in the laminate a film is heat bonded to both sides of said polypropylene fiber.

5. A pond liner of claim 2 wherein in the laminate said polypropylene fiber is heat bonded to each side of a film.

6. A pond liner of claim 1 wherein said strips of laminate are butt joined and the joint overlaid with a strip of polyethylene film having a density of about 0.905 to about 0.925 and heat sealed in a liquid-tight seam.

7. A pond liner of claim 6 wherein in the laminate a film is heat bonded on the unfused side of said polypropylene fiber.

8. A pond liner of claim 6 wherein in the laminate a film is heat bonded to both sides of said polypropylene fiber.

9. A pond liner of claim 6 wherein in the laminate said polypropylene fiber is heat bonded to each side of a film.

* * * * *